US008404360B2

(12) United States Patent
Ueda et al.

(10) Patent No.: US 8,404,360 B2
(45) Date of Patent: Mar. 26, 2013

(54) SIDE MATERIAL AND METHOD FOR PRODUCING THE SAME AND METHOD FOR PRODUCING CLAD MEMBER FOR HEAT EXCHANGER

(75) Inventors: Toshiki Ueda, Moka (JP); Kenji Tokuda, Moka (JP); Yasuhiro Nishioka, Moka (JP); Jitsuto Shikata, Moka (JP); Hiroshi Kunii, Moka (JP); Hideaki Hakuya, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 38 days.

(21) Appl. No.: 12/922,799

(22) PCT Filed: Mar. 25, 2009

(86) PCT No.: PCT/JP2009/055932
§ 371 (c)(1),
(2), (4) Date: Sep. 15, 2010

(87) PCT Pub. No.: WO2009/119653
PCT Pub. Date: Oct. 1, 2009

(65) Prior Publication Data
US 2011/0011573 A1    Jan. 20, 2011

(30) Foreign Application Priority Data
Mar. 28, 2008  (JP) .................. 2008-088505

(51) Int. Cl.
*B23P 9/00*    (2006.01)
(52) U.S. Cl. ......... 428/687; 428/105; 428/141; 228/174
(58) Field of Classification Search .................. 428/141, 428/105, 104, 687; 29/890.03, 890.39; 165/85; 164/69.1
See application file for complete search history.

(56) References Cited

U.S. PATENT DOCUMENTS
2009/0130481 A1 *  5/2009  Takada et al. ................. 428/650

FOREIGN PATENT DOCUMENTS
JP    63 130281    6/1988
JP    4 182122     6/1992
(Continued)

OTHER PUBLICATIONS
Office Action issued Aug. 31, 2012, in Korea Patent Application No. 2010/7021518 (with English-language Translation).

*Primary Examiner* — Jennifer McNeil
*Assistant Examiner* — Daniel J Schleis
(74) *Attorney, Agent, or Firm* — Oblon, Spivak, McClelland, Maier & Neustadt, L.L.P.

(57) ABSTRACT

Provided are a side member from which a clad member for heat exchanger exhibiting excellent productivity and corrosion resistance while preventing poor adhesion can be produced in production of a clad member for heat exchanger by controlling the surface state and flatness, a method for producing the side member, and a method for producing a clad member for a heat exchanger by using the side member. A side member (A) consists of a core material and one or more layers of side member (A) applied onto one side or both sides thereof and being used in a clad member for a heat exchanger, wherein a plurality of periodic forms (B) of fine groove which become arcuate toward one direction of the side member (A) is formed on the surface of the side member (A). The periodic form (B) of fine groove extends up to the outer circumferential edge of the side member (A) with a radius of curvature of 800-1500 mm and has a period (D) of 1-8 mm in the above-mentioned direction of the side member (A) and surface roughness of the side member (A) in the above-mentioned direction of 1-15 μm 10-point average roughness (Rz).

13 Claims, 6 Drawing Sheets

FOREIGN PATENT DOCUMENTS

| | | |
|---|---|---|
| JP | 05-245655 | 9/1993 |
| JP | 5 245655 | 9/1993 |
| JP | 2005 232507 | 9/2005 |
| JP | 2007 260770 | 10/2007 |
| WO | WO 2007/066714 * | 6/2007 |

* cited by examiner

F I G. 1
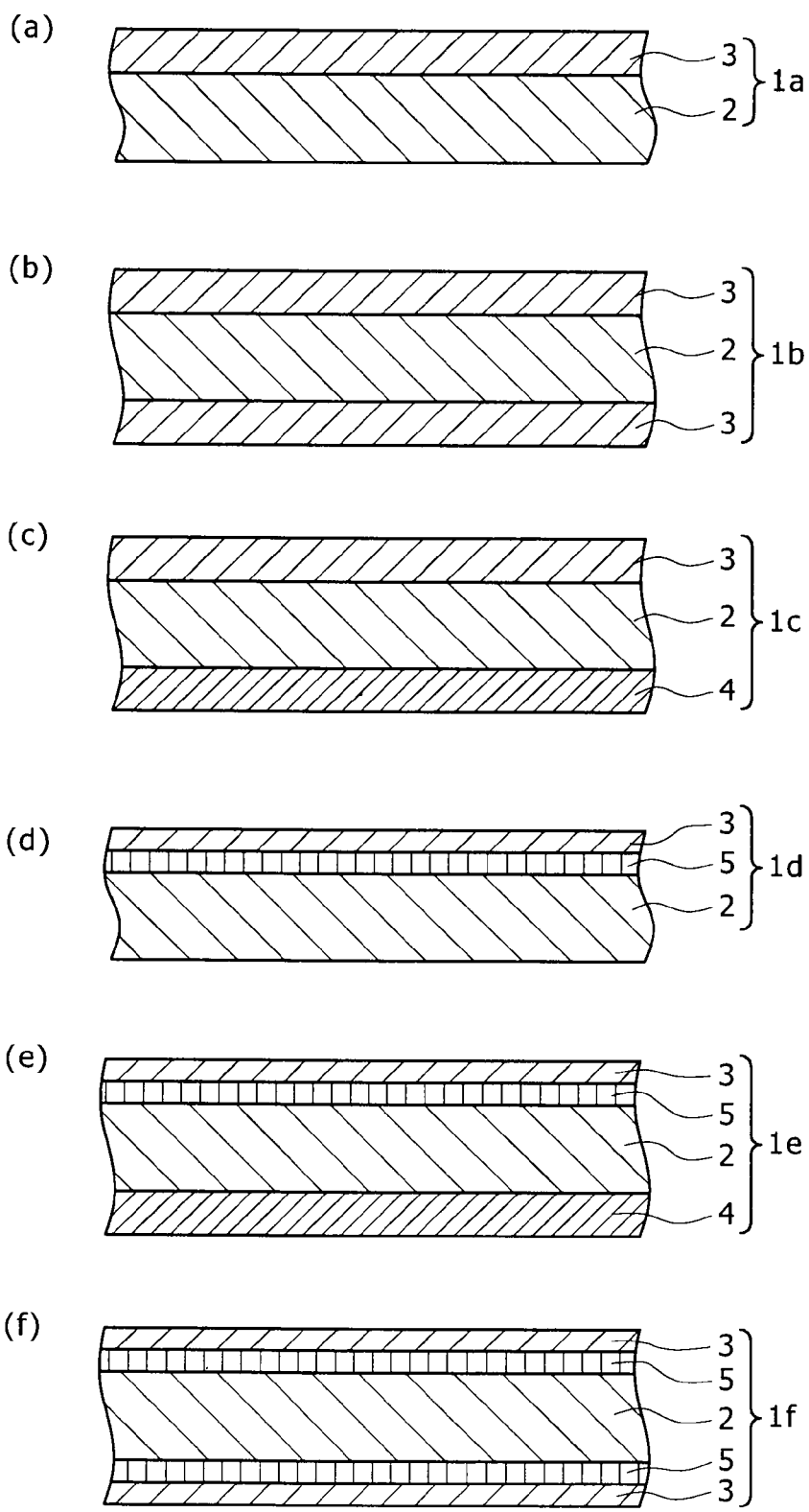

FIG. 2
(a)
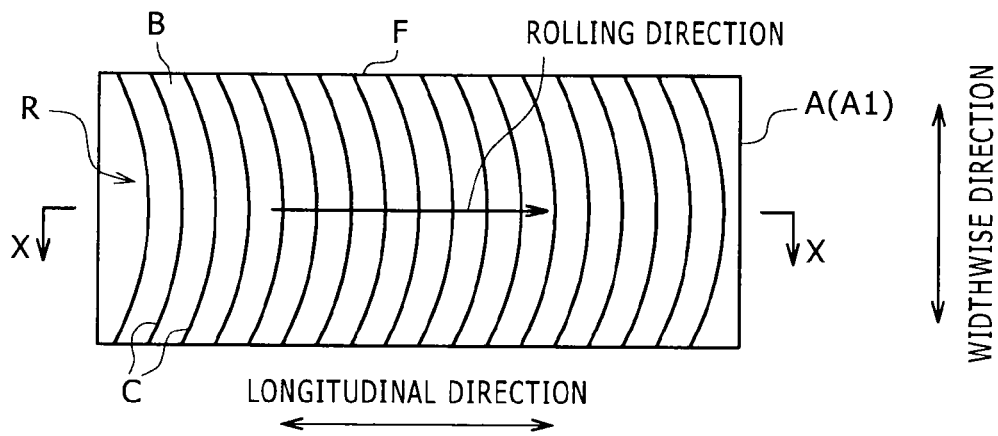
(b)
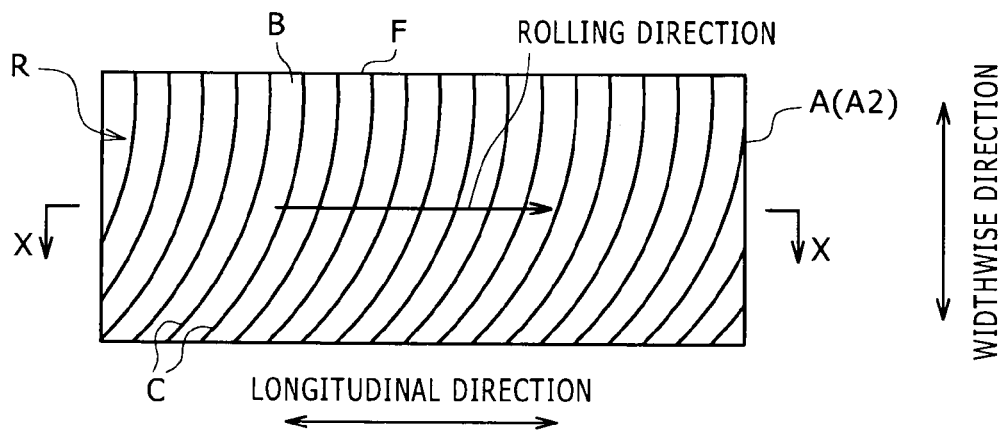
(c)
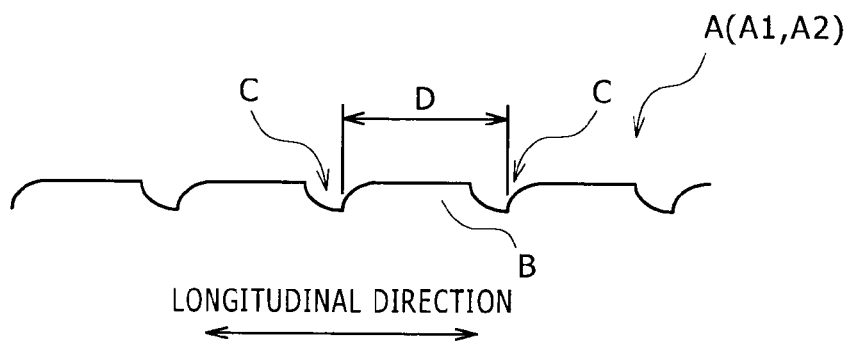

FIG. 3
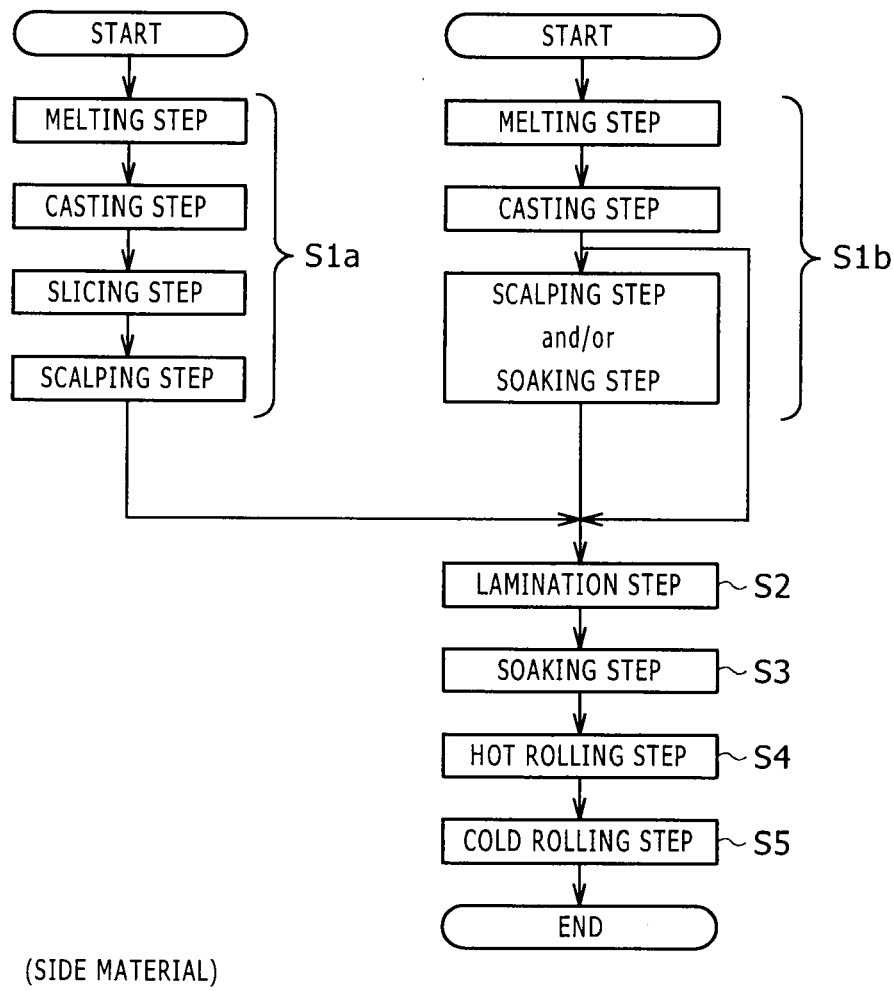
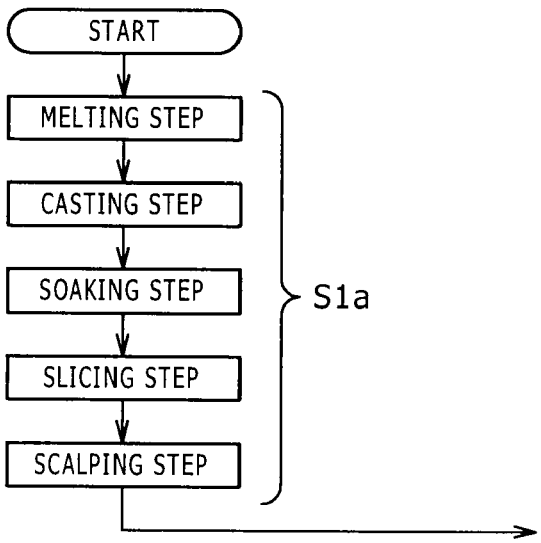

US 8,404,360 B2

SIDE MATERIAL AND METHOD FOR PRODUCING THE SAME AND METHOD FOR PRODUCING CLAD MEMBER FOR HEAT EXCHANGER

CROSS REFERENCE TO RELATED APPLICATION

This application is a 371 of PCT/JP09/055932, filed on Mar. 25, 2009, and claims priority to Japanese Patent Application No. 2008-088505, filed on Mar. 28, 2008.

TECHNICAL FIELD

The present invention relates to a side material used in a clad member for heat exchanger (brazing sheet) for use in a heat exchanger of an automotive vehicle or the like, a method for producing the same, and a method for producing a clad member for heat exchanger.

BACKGROUND ART

In general, in a clad member for heat exchanger used in an intercooler, an oil cooler, a radiator, a condenser, an evaporator, a heater core, or the like for an automotive vehicle, a side material is rolled or sliced from an ingot and used.

For example, in Patent Document 1, a method for producing a conventional typical clad member for heat exchanger is described as follows. First, an aluminum alloy for core material and aluminum alloys for side materials (which are a sacrificial anodic material and a brazing filler metal) are melted and cast by continuous casting, and subjected to homogenized heat treatment (or may also be subjected to surface smoothing) as necessary. Ingots of the aluminum alloys for side materials are each hot-rolled to a predetermined thickness (see S11a and S11b of FIG. 7, in which melting, casting, surface smoothing, homogenized heat treatment, and hot rolling are respectively referred to as Melting Step, Casting Step, Scalping Step, Soaking Step, and Hot Rolling Step).

Then, an ingot of the aluminum alloy for core material (core material) and hot-rolled sheets for side materials (side materials) are laminated, and produced into a clad member by hot rolling (cladding hot rolling) according to normal practice (see S12 and S13 of FIG. 7, in which lamination and hot rolling are respectively referred to as Lamination Step and Hot Rolling Step). In Patent Document 2, it is described that, as a side material to be used in a clad member for heat exchanger, a side material sliced from an ingot and having a predetermined thickness is used, and surface smoothing is performed to the side material.

Patent Document 1: Japanese Unexamined Patent Application Publication No. 2005-232507 (Paragraphs 0037, 0039, and 0040)

Patent Document 2: Japanese Unexamined Patent Application Publication No. 2007-260769 (Paragraphs 0027 to 0040)

DISCLOSURE OF THE INVENTION

Problems to be Solved by the Invention

However, a side material used in such a conventional clad member, a method for producing the same, or a method for producing the clad member has problems shown below.

(1) When a hot-rolled sheet is used as the side material, the number of the steps of producing the clad member is large, and the number of times of hot rolling increases to result in the problem that productivity decreases.

(2) An ingot for core material is mostly subjected to scalping treatment using a miller or the like so that a surface thereof is a scalped surface. On the other hand, a hot-rolled sheet for side material has a rolled surface formed with rolling lines which are produced along a rolling direction. Therefore, the respective surface states of the ingot for core material and the hot-rolled sheet for side material are different, and a problem arises that, when the ingot for core material and the hot-rolled sheet for side material are laminated and subjected to cladding hot rolling, poor adhesion is likely to occur between a core material and the side material. In order to improve the adhesion between the core material and the side material, multi-pass rolling at a low reduction becomes necessary in the cladding hot rolling so that productivity in the cladding hot rolling decreases.

(3) If the hot-rolled sheet is used as the side material, it follows that the control of the surface state and flatness (especially longitudinal flatness) of the rolled sheet is performed only with rolling rolls, and a thick oxide coating is formed on a surface of the rolled sheet by hot rolling. As a result, the control of the surface state and the flatness is difficult, and a problem arises that poor adhesion between the core material and the side material cannot be prevented.

(4) In the case where a sliced sheet sliced from an ingot is used as the side material, even when the surface state is controlled by controlling the flatness, the thickness of the oxide coating, or the like, if the control of the surface state (surface configuration) based on the regulation of the shape of a fine groove in a surface, surface roughness, or the like by slicing or surface smoothing is insufficient, a problem arises that partial poor adhesion still remains.

(5) When poor adhesion between the core material and the side material occurs, the problem that a predetermined clad ratio cannot be obtained, the problem of quality deterioration that abnormal quality such as blister occurs, and also the problem that corrosion resistance deteriorates due to poor adhesion also arise along with the problem of the decreased productivity of the clad member.

The present invention has been achieved in view of the problems described above, and an object thereof is to provide a side material of which the surface state and flatness are controlled and which allows the production of a clad member for heat exchanger in which poor adhesion is unlikely to occur and which is excellent in productivity and corrosion resistance in the production of the clad member for heat exchanger, a method for producing the same, and a method for producing the clad member for heat exchanger using the side material.

Means for Solving the Problems

To solve the problems mentioned above, a side material according to claim 1 is a side material used in a clad member for heat exchanger including a core material and one or more layers of the side material laminated on one side or both sides thereof, characterized in that a plurality of fine groove periodic configurations which become arcuate toward one direction of the side material are formed in a surface of at least one side of the side material, the fine groove periodic configurations extending to an outer peripheral edge of the side material with a radius of curvature of 800 to 1500 mm and having a period of 1 to 8 mm in the direction of the side material, and surface roughness of the side material in the direction is 1 to 15 μm in ten points mean roughness (Rz).

In such a side material, the plurality of fine groove periodic configurations each having a predetermined shape are formed in the surface of the side material. Accordingly, upon pressure bonding to the core material in the production of the clad member for heat exchanger, air present between the core material and each of the side materials (when there are a plurality of the side materials) is efficiently discharged via the fine groove periodic configurations, and adhesion improves. In addition, by regulating the surface roughness of the side material within a predetermined range, a clearance is unlikely to be formed between the core material and each of the side materials, and adhesion improves. As a result, pressure bondability (which herein indicates ease of pressure bonding performed by rolling) improves, and the number of pressure bonding passes (the number of times of hot rolling) decreases.

A side material according to claim 2 is characterized in that a flatness per meter in the direction is 1 mm or less.

In such a side material, by controlling the flatness to the predetermined value or less, the flatness further improves, and the adhesion between the core material and each of the side materials further improves. In addition, pressure bondability further improves, and the number of pressure bonding passes decreases.

A side material according to claim 3 is characterized in that a thickness is 10 to 250 mm.

In such a side material, by regulating the thickness within the predetermined range, the clad ratio of the clad member for heat exchanger is appropriately adjusted.

A method of producing a side material according to claim 4 is a method for producing a side material according to any one of claims 1 to 3, including: a melting step of melting a metal for side material having a component composition different from that of the core material; a casting step of casting the metal for side material melted in the melting step to produce an ingot for side material; a slicing step of slicing the ingot for side material into a slice material having a predetermined thickness; and a surface smoothing step of performing surface smoothing to a surface of the slice material having the predetermined thickness that has been sliced, characterized in that the steps are performed in the order shown above.

According to such a production method, the side material is produced by performing the slicing and the surface smoothing. Accordingly, the surface state and flatness of the side material can be easily controlled, and the thickness of the oxide coating decreases, while the fine groove periodic configurations each having the predetermined shape are formed in the surface and the surface roughness is regulated within the predetermined range. In addition, upon pressure bonding to the core material in the production of the clad member for heat exchanger, air present between the core material and each of the side materials is efficiently discharged, and adhesion improves. Moreover, pressure bondability improves, and the number of pressure bonding passes decreases. Furthermore, in the production of the clad member for heat exchanger, the side material sliced as a member for side material is used so that there is no need for a reduction in the thickness of the member for side material by hot rolling as needed in a conventional clad member for heat exchanger. As a result, the number of times of hot rolling (the number of pressure bonding passes) decreases compared with the conventional number of times of hot rolling, and working steps are saved.

A method for producing a side material according to claim 5, characterized in that, in the slicing step, the ingot for side material is sliced in parallel with a seating surface of the ingot for side material which is horizontally seated.

According to such a production method, the influence of a displacement (such as, e.g., the force of a cut ingot tending to fall down) of the cut ingot (sliced ingot) due to the self-weight or shape thereof which occurs upon slicing is minimized, the flatness of the sliced side material improves, and the adhesion between the core material and each of the side materials improves. In addition, pressure bondability improves, and the number of pressure bonding passes decreases.

A method for producing a side material according to claim 6, characterized by further including, after the casting step and prior to the slicing step: a homogenized heat treatment step of performing homogenized heat treatment to the cast ingot for side material.

According to such a production method, an internal stress of an ingot for side material is removed, the flatness of the sliced side material improves, and the adhesion between the core material and each of the side materials improves. In addition, pressure bondability improves, and the number of pressure bonding passes decreases.

A method for producing a side material according to claim 7, characterized in that the surface smoothing is performed by one or more methods selected from the group consisting of a cutting method, a grinding method, and a polishing method.

According to such a production method, the surface state and flatness of the side material improves, and the adhesion between the core material and each of the side materials improves. In addition, pressure bondability improves, and the number of pressure bonding passes decreases.

A method for producing a clad member for heat exchanger according to claim 8 is a method for producing a clad member for heat exchanger including a core material and one or more layers of a side material laminated on one side or both sides thereof, wherein at least one layer of the side material is a side material according to any one of claims 1 to 3, the method being characterized by including: a preparation step of preparing the side material and the core material on which the side material is to be laminated; a lamination step of laminating the core material and the side material into a predetermined configuration to provide a laminate material; a homogenized heat treatment step of performing homogenized heat treatment to the laminate material; a hot rolling step of performing hot rolling after the homogenized heat treatment step; and a cold rolling step of performing cold rolling after the hot rolling step.

According to such a production method, the side material of which the surface state and flatness are controlled is used as a member for side material. As a result, when the side materials are laminated on the core material, a clearance is unlikely to be formed between the core material and each of the side materials, and air present between the core material and each of the side materials is efficiently discharged via the fine groove periodic configurations, and adhesion improves. In addition, the number of pressure bonding passes can be reduced in the hot rolling step, and yield and productivity improve. As a result, the productivity and corrosion resistance of the clad member for heat exchanger improve.

Effects of the Invention

In the side material according to claim 1 of the present invention, the surface state and flatness of the side material are controlled. Therefore, in the production of the clad member for heat exchanger, poor adhesion is unlikely to occur, and defects such as blister can be reduced. Moreover, since pressure bondability improves, the number of pressure bonding passes can be reduced. Due to these effects, the clad member for heat exchanger excellent in productivity and corrosion resistance can be produced.

In the side material according to claim 2, a clearance is unlikely to be formed between the core material and each of the side materials, and adhesion and pressure bondability further improve. In the side material according to claim 3, the thickness of the side material is regulated, and therefore the clad member for heat exchanger having an appropriate clad ratio can be produced.

According to the method for producing the side material according to claim 4 of the present invention, the surface state and flatness of the side material can be easily controlled and the thickness of the oxide coating is reduced, while the surface state of the side material can be regulated to a predetermined state. Therefore, in the production of the clad member for heat exchanger, poor adhesion is less likely to occur, and defects such as blister can be reduced. In addition, since pressure bondability improves, the number of pressure bonding passes can be reduced. Moreover, because the side material is not produced by hot rolling, the thickness of a member for side material need not be reduced by hot rolling. Furthermore, in the production of the clad member for heat exchanger, the number of times of hot rolling decreases compared with the case where a conventional side material produced by hot rolling is used, and working steps can be saved. As a result, the clad member for heat exchanger excellent in productivity and corrosion resistance can be produced.

According to the method for producing the side material according to claim 5, the side material with improved flatness can be obtained, and the adhesion and pressure bondability with the core material further improves so that poor adhesion is less likely to occur. According to the method for producing the side material according to claim 6, by performing homogenized heat treatment to the ingot for side material, the flatness of the sliced side material further improves so that poor adhesion is less likely to occur.

According to the method for producing the side material according to claim 7, by performing the surface smoothing of the side material by one or more methods selected from the group consisting of a cutting method, a grinding method, and a polishing method, the surface state and flatness of the side material improve, and poor adhesion is less likely to occur.

According to the method for producing the clad material for heat exchanger according to claim 8, the side material produced by the method described above is used as the member for side material. Therefore, it is possible to produce the clad member for heat exchanger excellent in corrosion resistance in which the surface state and flatness of the member for side material are controlled, and poor adhesion is unlikely to occur. Also, the clad member for heat exchanger which is low in production cost can be produced.

BRIEF DESCRIPTION OF THE DRAWINGS

[FIGS. 1](a) to 1(f) are cross-sectional views each showing a structure of a clad member for heat exchanger according to the present invention.

[FIGS. 2] Schematic diagrams for illustrating the surface state of a side material according to the present invention, in which (a) and (b) are the schematic diagrams for illustrating the shapes of fine groove periodic configurations, and (c) is the schematic view showing a part of the cross section along the line XX in (a) and (b).

[FIGS. 3](a) and (b) are views showing the flow of a method for producing the clad member for heat exchanger according to the present invention.

Figure 4:
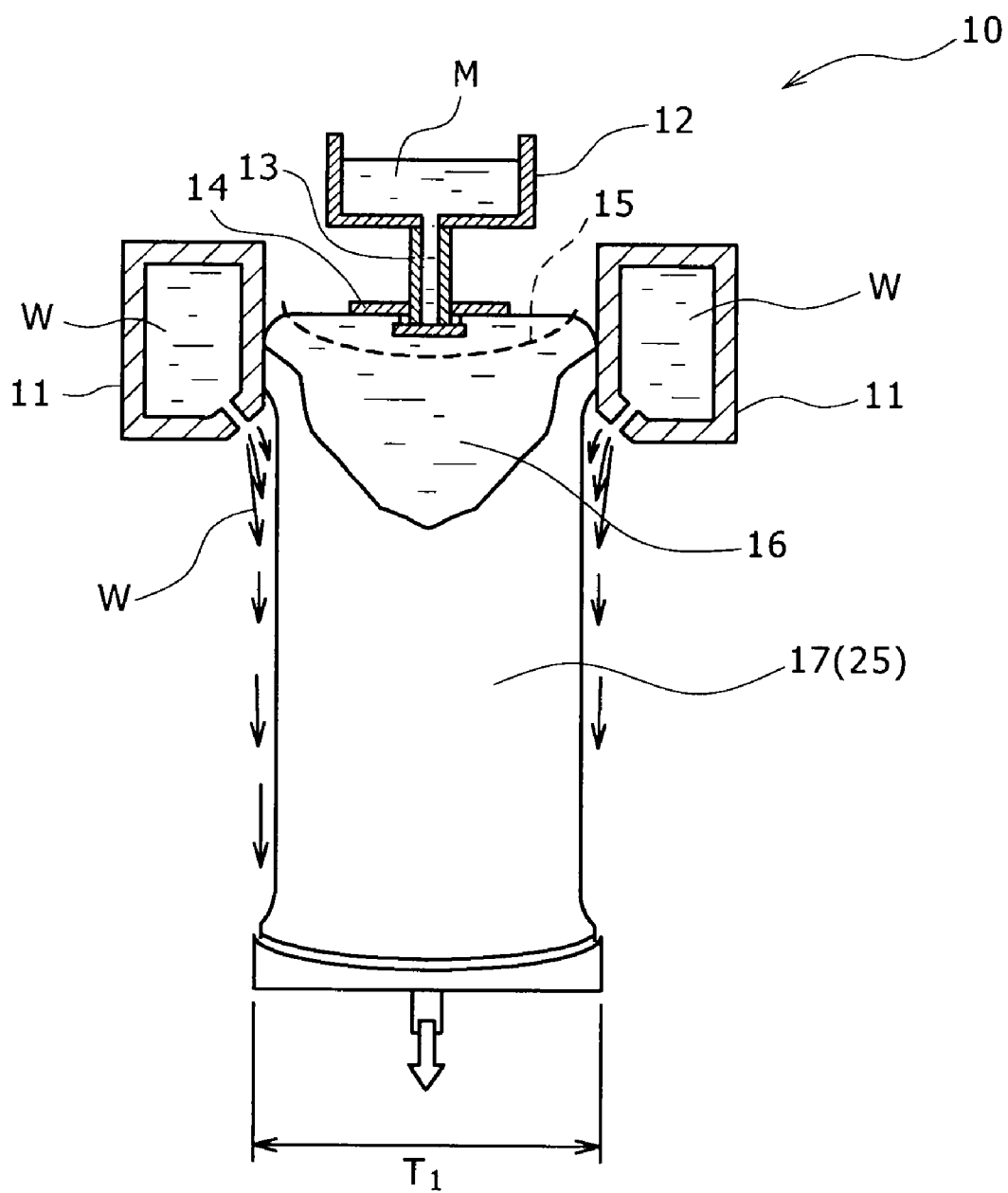
[FIG. 4] A schematic diagram sowing the outline of a side material casting step or a core material casting step.

| Explanations of Letters and Numerals | |
|---|---|
| S1a | Side Material Producing Step |
| S1b | Core Material ProducingStep |
| S2 | Lamination Step |
| S3 | Homogenized Heat Treatment Step |
| S4 | Hot Rolling Step |
| S5 | Cold Rolling Step |
| 1a, 1b, 1c, 1d, 1e, and 1f | Clad Member For Heat Exchanger |
| 2 | Core Material |
| 3 | Brazing Filler Metal |
| 4 | Sacrificial Material |
| 5 | Intermediate Material |
| 17 | Ingot for Side Material |
| 25 | Ingot for Core Material |
| 26 | Core Material |
| 35 | Side Material |
| 35a | Seating Surface |
| 40 | Laminate Material |
| A | Side Material |
| B | Fine Groove Periodic Configuration |
| C | Fine Groove |
| D | Period |
| F | Outer Peripheral Edge |

BEST MODE FOR CARRYING OUT THE INVENTION

Next, referring to the drawings, a side material, a method for producing the same, and a method for producing a clad member for heat exchanger each according to the present invention will be described in detail.

<<Side Material>>

A side material is used in a clad member for heat exchanger including a core material and one or more layers of a side material laminated on one side or both sides thereof. First, a structure of the clad member for heat exchanger using the side material will be described.

<Structure of Clad Member for Heat Exchanger>

The number of layers of the side material of the clad member for heat exchanger is by no means limited. For example, there can be listed a two-layer clad member for heat exchanger 1a in which one side of a core material 2 is clad with one brazing filler metal 3 as shown in FIG. 1(a), a three-layer clad member for heat exchanger 1b in which the both sides of the core material 2 are each clad with the brazing filler metal 3 in one-to-one correspondence as shown in FIG. 1(b), a three-layer clad member for heat exchanger 1c in which one side of the core material 2 is clad with the brazing filler metal 3 and the other side of the core material 2 is clad with a sacrificial material 4 in one-to-one correspondence as shown in FIG. 1(c), a three-layer clad member for heat exchanger 1d in which one side of the core material 2 is clad with an intermediate material 5 and the brazing filler metal 3 as shown in FIG. 1(d), a four-layer clad member for heat exchanger 1e in which one side of the core material 2 is clad with the intermediate material 5 and the brazing filler metal 3 and the other side of the core material 2 is clad with the sacrificial material 4 as shown in FIG. 1(e), a five-layer clad member for heat exchanger 1f in which the both sides of the core material 2 are clad with the intermediate material 5 and the brazing filler metal 3 as shown in FIG. 1(f), and the like. However, it will be appreciated that the side material is also appropriately applicable to a clad member for heat exchanger including six or more layers in which the number of layers of the side material (brazing filler metal, sacrificial material, and intermediate material) is further increased, though not shown.

Next, the surface state of the side material will be described.

As shown in FIGS. 2(a) to 2(c), a side material A (A1, A2) has, in a surface thereof, a plurality of fine groove periodic configurations B each of which becomes arcuate toward the longitudinal direction of the side material A. Each of the fine groove periodic configurations B extends with a radius of curvature R of 800 to 1500 mm to an outer peripheral edge F of the side material A, and has a period D of 1 to 8 mm in the longitudinal direction of the side material A. Further, the surface roughness of the side material A in the longitudinal direction thereof is 1 to 15 μm in ten points mean roughness (Rz). Note that, as described later, the surface state of the side material A is controlled by appropriately adjusting the rotation speed, feeding speed, or the like of the disc of a disc apparatus in surface smoothing.

Note that, as shown in FIG. 2(c), the fine groove periodic configuration B indicates the configuration with the period D including the configuration of the portion with a fine groove C at one location. That is, the portion with the period D corresponds to one period of the fine groove periodic configuration B. The configuration of the portion with the fine groove C also includes a configuration in which a plurality of minute grooves are formed in the portion with the fine groove C (the depiction thereof is omitted). The configuration of the portion with the fine groove C is like a cutting mark, a grinding mark, a polishing mark, or the like produced during surface smoothing. Note that FIG. 2(c) is a schematic diagram enlarged in a vertical direction for the sake of convenience.

Note that, at the stage of initial pressure bonding of cladding, after air is discharged from the fine groove periodic configurations B, the side material and the core material are integrated with each other, while the fine groove periodic configurations B self-collapse due to hot rolling. Therefore, no problem occurs in the clad member due to the fine groove periodic configurations B.

The longitudinal direction is a rolling direction when the side material A is laminated on the core material and hot-rolled in the production of the clad member for heat exchanger described later. In addition, "which becomes arcuate toward the longitudinal direction of the side material A" indicates that each of the fine groove periodic configurations B becomes arcuate in the same direction toward either one side in the longitudinal direction of the side material A. Thus, when the side material A before being laminated on the core material and hot-rolled independently exists, the longitudinal direction is not determined yet. It follows that, according to the direction of the fine groove periodic configurations B, the rolling direction is determined, as shown in FIG. 2.

By regulating the radius of curvature R and period D of the fine groove periodic configurations B to predetermined values, air present between the core material and each of the side materials is efficiently discharged via the fine groove periodic configurations B upon pressure bonding to the core material in the production of the clad member for heat exchanger. In addition, by regulating surface roughness to a predetermined value, a clearance is unlikely to be formed between the core material and each of the side materials. As a result, adhesion improves and defects such as blister can be reduced, while pressure bondability improves and the number of pressure bonding passes can be reduced.

The fine groove periodic configurations B need to be provided in at least one of the both sides of the side material to be clad with the core material. The fine groove periodic configurations B are unnecessary in the side (i.e., the outermost surface during pressure bonding/rolling) not to be clad. However, even if the fine groove periodic configurations B are provided in that side, there is no particularly adverse influence. Even in the case with a four-layer material or an intermediate layer of a five-layer material, it is necessary to provide the fine groove periodic configurations B in at least a side to be clad with the core material, while the fine groove periodic configurations B are unnecessary in the side opposite to the core material. Even if the fine groove periodic configurations B are provided in the side opposite to the core material, there is no particularly adverse influence.

<Radius of Curvature of Fine Groove Periodic Configurations: 800 to 1500 mm>

When the radius of curvature R of the fine groove periodic configurations B is less than 800 mm, the remaining of air in the hot rolling step in the production of the clad member for heat exchanger described later is localized, and the effect of improving adhesion and pressure bondability becomes insufficient. On the other hand, when the radius of curvature R exceeds 1500 mm, the distance over which air is discharged becomes excessively long, and the effect of improving adhesion and pressure bondability becomes insufficient.

Accordingly, the radius of curvature R of the fine groove periodic configurations R is set to 800 to 1500 mm.

Note that, preferably, the radius of curvature R of the fine groove periodic configurations R is 900 to 1300 mm. Note that the fine groove periodic configurations B extend to the outer peripheral edge F of the side material A. That is, the fine groove periodic configurations B are formed continuously toward the outer peripheral edge F of the side material A without being interrupted.

When the radius of curvature of the fine groove periodic configurations B becomes extremely large, and the groove becomes close to being linear, if the direction (longitudinal direction) during rolling is set as described above, the groove has a shape extending in a direction generally perpendicular to the rolling direction. In that case, the force to discharge air (pushed out under the pressure of rolling rolls) along the grooves becomes hard to act. The upper limit value of the radius of curvature R is provided from such a viewpoint.

The measurement of the radius of curvature R is such that, e.g., the fine groove periodic configurations are photographed, and the curvature of the corresponding arc can be measured on a photograph or on a monitor capable of processing a photographed image in consideration of a magnification.

<Period of Fine Groove Periodic Configurations: 1 to 8 mm>

Here, the period D of the fine groove periodic configurations B which is 1 to 8 mm indicates that the period D in the longitudinal direction has a generally fixed value even at any location in the period D of the fine groove periodic configurations B, and the value thereof is in the range of 1 to 8 mm.

If the period D of the fine groove periodic configurations B is less than 1 mm, a discharge path for air cannot be ensured, and air cannot be sufficiently discharged. On the other hand, if the period D exceeds 8 mm, the number of the fine groove periodic configurations B decreases, air remaining between the core material and each of the side materials increases, and the generation of blister increases.

Accordingly, the period D of the fine groove periodic configurations B is set to 1 to 8 mm. Note that, preferably, the period D is 2 to 7 mm.

The arcuate shape of the fine groove periodic configuration B may be such that the center of the arc is at the widthwise center position of the side material A as shown in FIG. 2(a), or the center of the arc is at a position deviated from the widthwise center of the side material A on either side, as shown in FIG. 2(b).

The measurement of the period can be performed by, e.g., producing a replica in which the arcuate shape of the surface of the side material having the fine groove periodic configurations onto a resin, and measuring the surface roughness of the resin in the same manner as in the method for measuring ten points mean roughness described later.

Such a shape of the fine groove periodic configuration B can be controlled by the surface smoothing of a slice material described later.

To form the fine groove periodic configurations B into shapes as shown in FIG. 2(a), when, e.g., a cutting method, a grinding method, a polishing method, or the like is used as a surface smoothing method as described later, these methods are practiced in combination with a rotating disc apparatus. At that time, smoothing heat treatment is performed horizontally with the longitudinal direction of an ingot (slice material) such that the center of the rotating disc apparatus corresponds to the widthwise center of the ingot. In order to provide shapes as shown in FIG. 2(b), when the surface smoothing is performed as described above, the surface smoothing is performed horizontally to the longitudinal direction of the ingot and by displacing the center of the rotating disc apparatus from the widthwise center of the ingot on either side. Note that, in this case, at each of the both end portions of the side material A, the fine groove periodic configurations B are interrupted at the longitudinal edge depending on the size of the side material A. However, it can be said that the fine groove periodic configurations B at each of the both end portions are also formed to be arcuate toward the longitudinal direction.

<Ten Points Mean Roughness (Rz): 1 to 15 μm>

The surface roughness of the side material A in the longitudinal direction thereof is 1 to 15 μm in ten points mean roughness (Rz). If the ten points mean roughness (Rz) is less than 1 μm, an air discharge path is not sufficiently ensured. On the other hand, if the ten points mean roughness (Rz) exceeds 15 μm, poor adhesion is likely to occur in the clad member for heat exchanger. Accordingly, the surface roughness is set to 1 to 15 μm in ten points mean roughness (Rz). Note that, preferably, the surface roughness is 3 to 14 μm. In the ten points mean roughness (Rz) regulated herein, shapes including also the fine grooves C are reflected. That is, to the surface roughness mentioned here, the fine grooves C primarily contribute.

The measurement of the ten points mean roughness can be performed by performing measurement with a reference length of 25 mm using a surface roughness meter (SURF-CORDER SE-30D) produced by Kosaka Laboratory Ltd. based on "JIS Standard B0601 Surface Roughness". Measurement is also performed to include a length corresponding to at least two periods or more at a portion of the surface of the side material A where the fine groove periodic configurations B are formed. That is, measurement is performed to also include the fine grooves C.

Such regulation of the surface roughness can be controlled by surface smoothing of the slice material described later.

Furthermore, the flatness of the side material A per meter in the longitudinal direction is preferably 1 mm or less, and the thickness of the side material A (thickness of one layer of the side material) is preferably 10 to 250 mm.

<Flatness: 1 mm or less>

If the flatness exceeds 1 mm, poor adhesion is likely to occur in the clad member for heat exchanger.

Accordingly, the flatness is preferably 1 mm or less, or more preferably 0.5 mm or less.

The measurement of the flatness can be performed by, e.g., applying a 1 m steel rule such that the side material measures 1 m in the longitudinal direction, and measuring the resulting clearance using a clearance gauge.

<Thickness: 10 to 250 mm>

If the thickness is less than 10 mm, when the side material and the core material are pressure-bonded, due to the extreme thinness of the side material, non-uniform deformation such as waving occurs in the side material itself, and the clad thickness is likely to fluctuate to increase variations in clad ratio. On the other hand, if the thickness exceeds 250 mm, a load from rolling rolls pressing the side material upon pressure bonding does not sufficiently reach the pressure-bonded interface between the side material and the core material. As a result, the pressure-bonded state becomes non-uniform so that the elongation of the side material portion upon rolling varies correspondingly to the non-uniformity of the pressure-bonded state to serve as a factor which increases fluctuations in clad ratio.

Therefore, if the thickness is outside the range shown above, the clad ratio of the clad member for heat exchanger is likely to be inappropriate. In addition, there is also a case where poor adhesion occurs.

Accordingly, the thickness is preferably 10 to 250 mm, or more preferably 20 to 200 mm.

Note that, during the production of the clad member for heat exchanger, when the side material A is pressure-bonded in a hot rolling step, the effect of improving adhesion and pressure bondability is achieved without particularly regulating the surface state of the counterpart material (core material or another side material when an intermediate layer is necessary) with which the side material A is to be pressure-bonded.

If the counterpart material (core material or another side material when an intermediate layer is necessary) with which the side material A is to be pressure-bonded has the same surface state as that of the side material A of the present invention, the effect of discharging air during pressure bonding further increases so that the effect of improving adhesion and pressure bondability is further obtained, and the effect of reducing blister is obtained. Therefore, when the counterpart material to which the side material A is to be pressure-bonded is a side material for intermediate layer, it is preferable to provide the same surface state as that of the side material of the present invention by surface smoothing. When the counterpart material to which the side material A is to be pressure-bonded is the core material, it is preferable to provide the same surface state as that of the side material of the present invention by performing the surface smoothing in the same manner as performed to the side material of the present invention.

Note that, during the production of the clad member for heat exchanger, when the side material A is pressure-bonded in the hot rolling step, by performing hot rolling such that the direction of hot rolling during pressure bonding corresponds to the rolling direction shown in FIGS. 2(a) and 2(b), the effect of improving adhesion and pressure bondability is maximally obtained.

<<Method for Producing Side Material (Side Material Producing Step)>>

As shown in FIGS. 3(a) and 3(b), a method for producing the side material is for producing the side material described above by a side material producing step S1a.

The side material producing step S1a includes a melting step, a casting step, a slicing step, and a surface smoothing step (referred to as Scalping Step in FIG. 3).

Note that, as necessary, a homogenized heat treatment step (referred to as Soaking Step in FIG. 3) may also be included after the casting step and prior to the slicing step described above.

(Melting Step)

The melting step is the step of melting a metal for side material having a component composition different from that of the core material.

When the clad member for heat exchanger includes a brazing filler metal (see 1a to 1f of FIG. 1) as a metal for side material, a 4000-series Al—Si-type aluminum alloy may be used as the brazing filler metal. Here, an Al—Si-type alloy includes also an alloy containing Zn in addition to Si. As the Al—Si-type alloy, for example, an Al-7 to 13 mass % Si alloy, an Al-7 to 13 mass % Si-2 to 7 mass % Zn alloy, or the like can be used. However, the alloy for brazing filler metal is not limited thereto. Any alloy can be applied as long as the alloy is used as the brazing filler metal.

When the clad member for heat exchanger includes a sacrificial material (see 1c and 1e of FIG. 1) as a metal for side material, a 3000-series Al—Mn aluminum alloy or a 7000-series Al—Zn—Mg aluminum alloy can be used as the sacrificial material. Also, an Al—Zn alloy can be used as the sacrificial material. Here, an Al—Zn alloy includes an alloy containing Mn or Si in addition to Zn. As the Al—Zn alloy, for example, an Al-1 to 7 mass % Zn alloy, an Al-0.5 to 1.2 mass % Mn-0.5 to 1.2 mass % Si-2 to 6 mass % Zn alloy, or an Al-0.8 to 1.2 mass % Si-2 to 6 mass % Zn alloy can be used. However, the alloy for sacrificial material is not limited thereto. Any alloy can be applied as long as the alloy is used as the sacrificial material.

When the clad member for heat exchanger includes an intermediate material (see 1d to 1f of FIG. 1) as the metal for side material, 1000-series pure aluminum, a 7000-series Al—Zn—Mg aluminum alloy, or the like can be used as the intermediate material. Also, an Al—Mn alloy can be used as the intermediate material. Here, an Al—Mn alloy includes an alloy containing Cu, Si, or Ti in addition to Mn. As the Al—Mn alloy, for example, an Al-0.5 to 1.2 mass % Mn-0.5 to 1.2 mass % Cu-0.5 to 1.2 mass % Si alloy, or an Al-0.5 to 1.2 mass % Mn-0.5 to 1.2 mass % Cu-0.5 to 1.2 mass % Si-0.05 to 0.3 mass % Ti alloy can be used. However, the alloy for intermediate material is not limited thereto. Any alloy can be applied as long as the alloy is used as the intermediate material.

The adjustment of the component composition of each of the metals shown above can be determined appropriately depending on the application of the clad member for heat exchanger to be used or the like.

(Casting Step)

The casting step is the step of casting the metal for side material melted in the melting step to produce an ingot for side material.

As a casting method, a semi-continuous casting method can be used.

In the semi-continuous casting method, a casting apparatus 10 as shown in FIG. 4 is used, a molten metal M of a metal (which is the metal for side material here) is injected into a metallic water-cooled mold 11 having an open bottom portion from thereabove, and the solidified metal is continuously collected from the bottom portion of the water-cooled mold 11 so that an ingot for side material 17 having a predetermined thickness $T_1$ is obtained. At this time, the molten metal M is supplied from a tub 12 to the water-cooled mold 11 via a nozzle 13, a float 14, and a glass screen 15. The molten metal M supplied to the water-cooled mold 11 is solidified by contact with the inner wall surface of the water-cooled mold 11 cooled with cooling water W to become a solidified shell 16. Further, the cooling water W is directly sprayed from the lower portion of the water-cooled mold 11 to the surface of the solidified shell 16 so that the ingot for side material 17 is continuously produced.

Here, the thickness $T_1$ of the ingot for side material 17 is preferably 200 to 700 mm. The width and length of the ingot for side material 17 are not particularly limited. However, in consideration of productivity, it is preferable that the width is 1000 to 2500 mm and the length is 3000 to 10000 mm.

Note that the semi-continuous casting method may be practiced either vertically or horizontally.

(Slicing Step)

The slicing step is the step of slicing the ingot for side material into slice materials each having a predetermined thickness.

As the slicing method, a slab slice method can be used.

Figure 5:
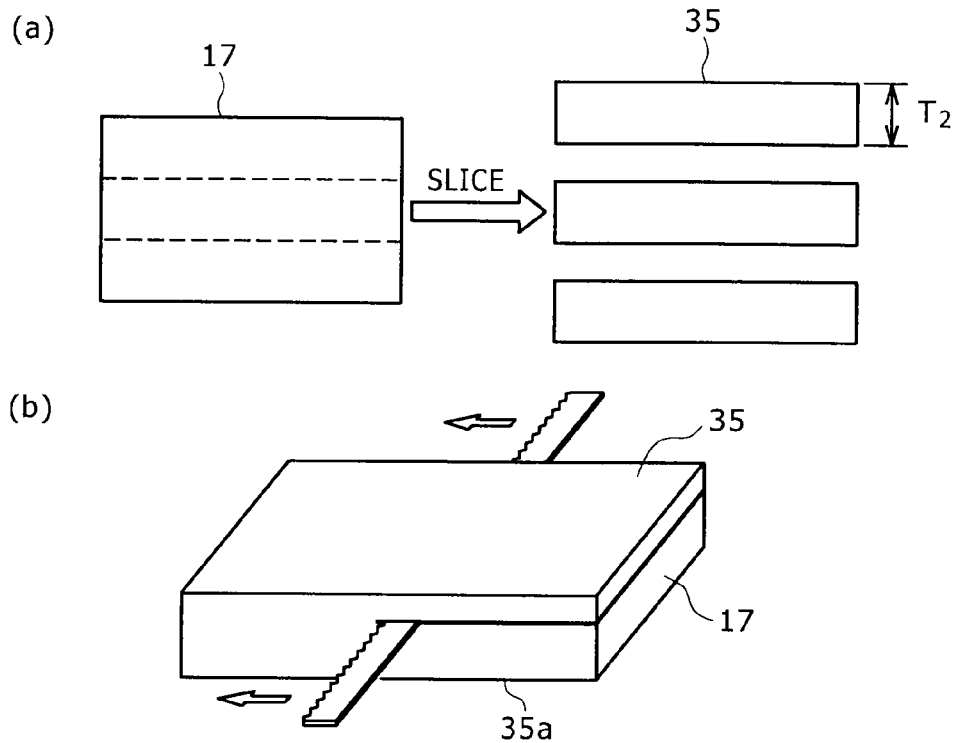
[FIGS. 5](a) and (b) are schematic diagrams showing the outline of a method for slicing the side material.

In the slab slice method, as shown in FIG. 5(a), by slicing the ingot for side material 17 produced by the semi-continuous casting method described above with a band saw cutter or the like not shown, side materials 35 (slice materials) each having a predetermined thickness $T_2$ are produced. Here, the thickness $T_2$ of the side material 35 is such that a thickness after surface smoothing is preferably 10 to 250 mm, or more preferably 20 to 200 mm. When the thickness $T_2$ is outside the range shown above, the clad ratio of the clad member for heat exchanger is likely to be inappropriate. In addition, as shown in FIG. 5(b), the ingot for side material 17 is preferably sliced in parallel with a seating surface 35a of the ingot for side material which is horizontally seated.

Here, the seating surface 35a is the surface of the ingot for side material 17 in contact with a stand where a slicing apparatus is placed.

In this manner, the influence of a displacement (such as, e.g., the force of a cut ingot tending to fall down) of a cut ingot (sliced ingot) due to the self-weight or shape thereof which occurs upon slicing is minimized, and the flatness of the sliced side material 35 further improves.

As a method for slicing, cutting may also be performed with a disc saw cutter, or cutting may also be performed with a laser, water pressure, or the like.

(Surface Smoothing Step)

The surface smoothing step is the step of performing surface smoothing to the surface of each of the sliced side materials (slice materials) having the predetermined thickness.

Before being laminated on the core material, the sliced side material 35 (slice material) having the predetermined thickness is subjected to the surface smoothing for controlling the surface state or flatness of the side material and for removing a crystallization product or an oxide formed on the surface.

As a surface smoothing method, a cutting method such as end mill cutting or diamond bit cutting, a grinding method which grinds the surface with a grindstone or the like, a polishing method such as buff polishing, or the like can be used. However, the surface smoothing method is not limited thereto.

Note that, when a cutting method such as end mill cutting or diamond bit cutting, a grinding method involving grinding with a grindstone or the like, a polishing method such as buff polishing, or the like is used for example in the surface smoothing, by performing cutting, grinding, polishing, or the like in combination with a rotating disc-shaped apparatus, the surface state of the side material of the present invention can be obtained. At that time, by controlling the rotating speed of the disc and the feeding speed of the disc over the slice material, the surface state having the desired fine groove periodic configurations B can be obtained.

Thus, by performing the surface smoothing after slicing the ingot for side material 17, there can be obtained the side material 35 having, in a surface thereof, the plurality of fine groove periodic configurations B each formed to become arcuate toward the longitudinal direction of the side material, extend to the outer peripheral edge of the side material with a radius of curvature of 800 to 1500 mm, or preferably 900 to 1300 mm, and have a period of 1 to 8 mm, or preferably 2 to 7 mm in the longitudinal direction. There can also be obtained the side material 35 of which the surface roughness in the longitudinal direction is 1 to 15 μm, or preferably 3 to 14 μm in ten points mean roughness (Rz) and of which the flatness per meter in the longitudinal direction is 1 mm or less, or preferably 0.5 mm or less in the evaluation of the flatness.

In addition, by using such a side material 35, a clad member for heat exchanger is obtained in which, after a CASS test (salt water spray test: JIS Z 2371) is performed for 1500 hours as a test for outer surface corrosion resistance and an immersion test ($Na^+$: 118 ppm, $Cl^-$: 58 ppm, $SO_4^{2-}$: 60 ppm, $Cu^{2+}$: 1 ppm, and $Fe^{3+}$: 30 ppm) is performed at 80° C. for 2000 hours as a test for inner surface corrosion resistance, the depth of corrosion after the tests is 60 μm or less.

(Homogenized Heat Treatment Step)

The homogenized heat treatment step is the step of further performing homogenized heat treatment to the cast ingot for side material.

As shown in FIG. 3(*b*), to the ingot for side material 17 cast by the casting method described above, homogenized heat treatment for removing an internal stress may also be performed appropriately as necessary by the homogenized heat treatment step before the ingot for side material 17 is sliced. By performing the homogenized heat treatment, the internal stress of the ingot for side material 17 is removed, and the flatness of the sliced side material 35 further improves. Here, the temperature and period of the homogenized heat treatment are not particularly limited, but it is preferable that the treatment temperature is set to 350 to 600° C., and the treatment period is set to 1 to 10 hours.

If the treatment temperature of the homogenized heat treatment is less than 350° C., the amount of removal of the internal stress is small, the homogenization of solute elements segregated during casting becomes insufficient, and the effect of having daringly performed heat treatment is small. On the other hand, if the treatment temperature exceeds 600° C., a phenomenon called burning occurs in which a part of the surface of the ingot melts, and is likely to cause a surface defect in the clad member for heat exchanger. If the treatment period is less than one hour, the effect of removing the internal stress is small, and the homogenization is likely to be insufficient. Note that, in consideration of productivity, the treatment time is preferably ten hours or less.

<<Method for Producing Clad Member for Heat Exchanger (Clad Member for Heat Exchanger Producing Step)>>

The method for producing the clad member for heat exchanger is a method for producing a clad member for heat exchanger including a core material and one or more layers of a side material laminated on one side or both sides thereof, and includes a preparation step including the side material producing step S1*a* and a core material producing step S1*b*, a lamination step, a homogenized heat treatment step S3 (referred to as Soaking Step in FIG. 3), a hot rolling step S4, and a cold rolling step S5, as shown in FIGS. 3(*a*) and 3(*b*).

<Preparation Step>

The preparation step is the step of preparing the side material and the core material on which the side material is to be laminated.

In the preparation step, by the side material producing step S1*a* and the core material producing step S1*b*, the side material and the core material are produced.

-Side Material Producing Step-

Since the side material producing step S1*a* is as described above, a description thereof is omitted here.

Note that, in the clad member for heat exchanger, at least one layer of the side material may be produced by the production method (side material producing step S1*a*) described above, and the other layer may be produced by a conventional production method.

-Core Material Producing Step-

As shown in FIG. 3(*a*), it is assumed that the core material producing step S1*b* includes the melting step and the casting step.

Note that, as necessary, the core material producing step S1*b* may also include at least one of the surface smoothing step (referred to as Scalping Step in FIG. 3) and the homogenized heat treatment step (referred to as Soaking Step in FIG. 3).

(Melting Step)

The melting step is the step of melting a metal for core material having a component composition different from that of the side material.

As the metal for core material, a 2000-series Al—Cu aluminum alloy, a 3000-series Al—Mn aluminum alloy, a 5000-series Al—Mg aluminum alloy, or the like can be used. However, the metal for core material is not limited thereto. Any alloy can be used as long as the alloy is used as the core material. The adjustment of the component composition of the metal described above can be determined appropriately depending on the application of the clad member for heat exchanger to be used.

(Casting Step)

The casting step is the step of casting the metal for core material melted in the melting step to produce an ingot for core material.

As a casting method, the semi-continuous casting method described above can be used.

Here, the thickness $T_1$ (see FIG. 4) of an ingot for core material 25 is preferably 200 to 700 mm. If the thickness $T_1$ is outside the range shown above, the clad ratio of the clad member for heat exchanger is likely to be inappropriate. The width and length of the ingot for core material 25 are not particularly limited. However, in consideration of productivity, it is preferable that the width is 1000 to 2500 mm, and the length is 3000 to 10000 mm.

As necessary, the ingot for core material 25 cast by the casting method described above may also be subjected appropriately to at least one of the surface smoothing for removing a crystallization product or an oxide formed on the surface before the side material 35 described above is laminated thereon and the homogenized heat treatment for removing an internal stress.

(Surface Smoothing Step)

The surface smoothing step is the step of performing the surface smoothing to the surface of the ingot for core material produced in the casting step.

By performing the surface smoothing in the surface smoothing step, the core material can be obtained of which the surface roughness in the longitudinal direction is 1 to 15 μm, or preferably 3 to 14 μm in ten points mean roughness (Rz) and of which the flatness per meter in the longitudinal direction is 1 mm or less, or preferably 0.8 mm or less in the evaluation of the flatness. If the surface roughness is less than the range shown above, a mark is likely to be generated, and working is likely to be difficult. If the surface roughness exceeds the range shown above, poor adhesion is likely to occur in the clad member for heat exchanger. If the flatness exceeds the range shown above, poor adhesion is likely to occur in the clad member for heat exchanger.

Note that, as described above, by performing the surface smoothing in the same manner as performed to the side material of the present invention, the same surface state as that of the side material of the present invention can also be provided in the core material.

(Homogenized Heat Treatment Step)

The homogenized heat treatment step is the step of performing the homogenized heat treatment to the ingot for core material cast in the casting step. By performing the homogenized heat treatment in the homogenized heat treatment step, the internal stress of the ingot for core material 25 is removed, and the flatness of the core material further improves. Here, the temperature and period of the homogenized heat treatment are not particularly limited. However, it is preferable that the treatment temperature is set to 350 to 600° C., and the treatment period is set to 1 to 10 hours. If the treatment temperature of the homogenized heat treatment is less than 350° C., the amount of removal of the internal stress is small, the homogenization of solute elements segregated during casting becomes insufficient, and the effect of having daringly performed heat treatment is small. On the other hand, if the treatment temperature exceeds 600° C., a phenomenon called burning occurs in which a part of the surface of the ingot melts, and is likely to cause a surface defect in the clad member for heat exchanger. If the treatment period is less than one hour, the effect of removing the internal stress is small, and the homogenization is likely to be insufficient. Note that, in consideration of productivity, the treatment time is preferably ten hours or less.

<Lamination Step>

The lamination step S2 is the step of laminating the core material and the side material that are prepared in the preparation step into a predetermined configuration to provide a laminate material 40.

Figure 6:
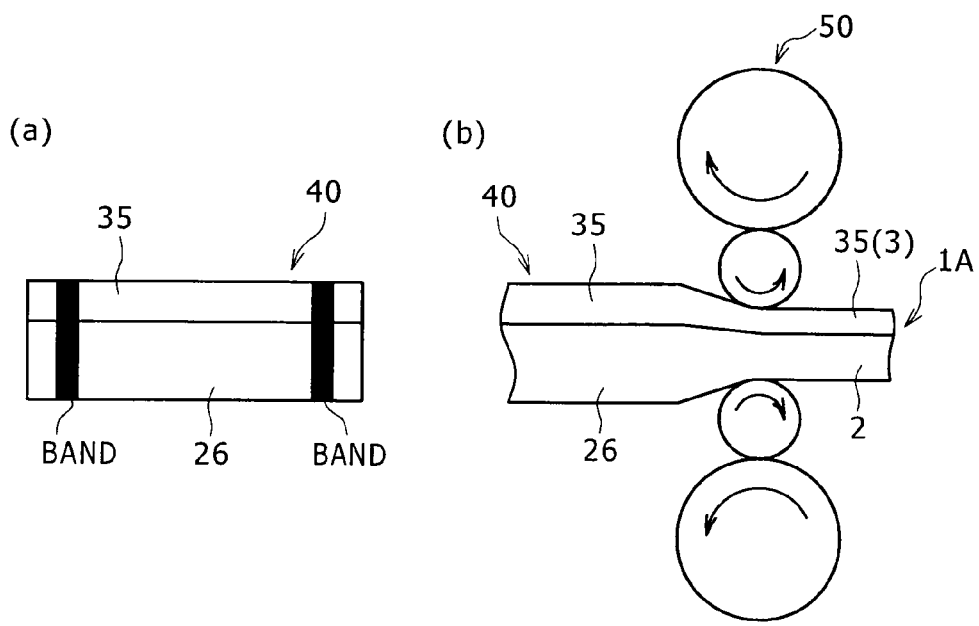
[FIGS. 6](a) is a schematic diagram showing a structure of a laminate material, and (b) is a schematic diagram showing the outline of a hot rolling step.
Figure 7:
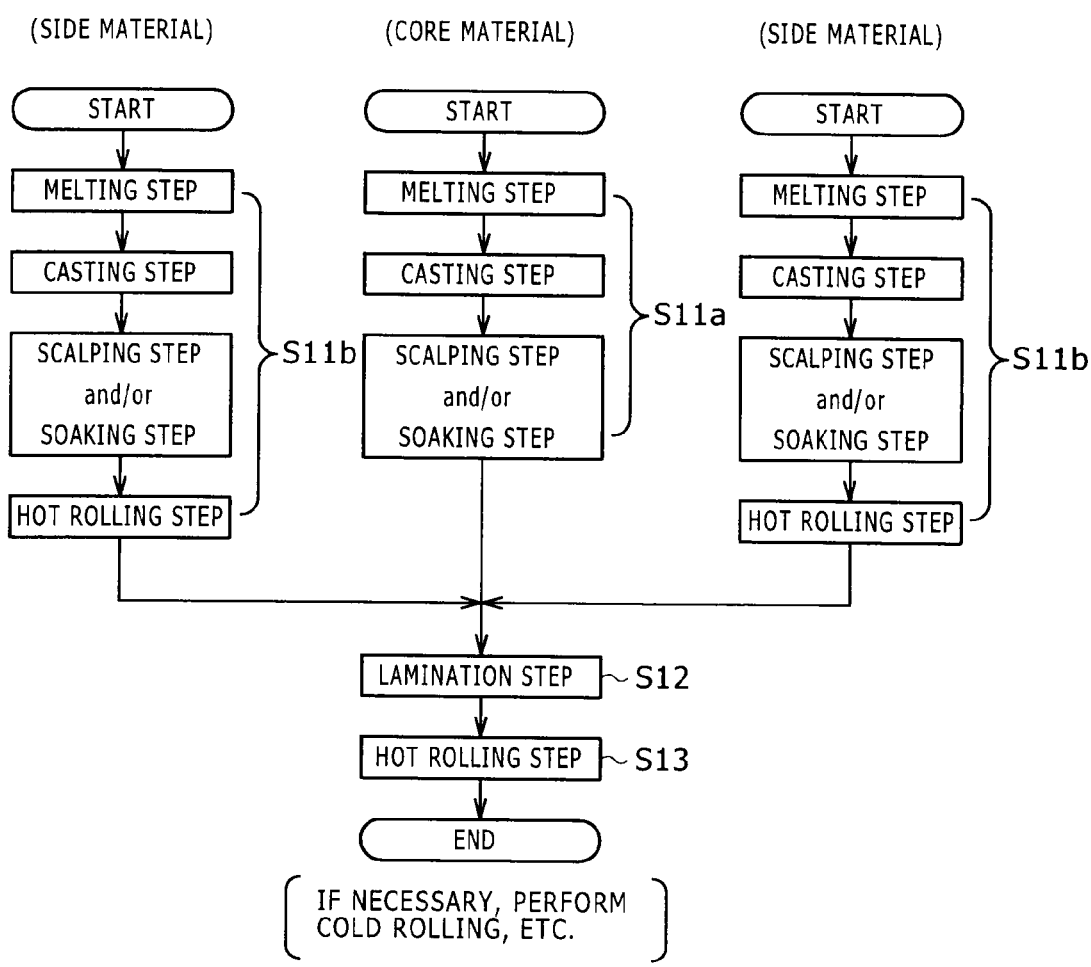
[FIG. 7] A view showing the flow of a method for producing a conventional clad member for heat exchanger.

In the lamination step S2, as shown in FIG. 6(a), one side material 35 or a plurality of side materials (the depiction thereof is omitted) are laminated in a predetermined configuration on one side or both sides (the depiction thereof is omitted) of a core material 26 formed to have a predetermined length by cutting the front end and rear end of the ingot for core material 25 (see FIG. 4) produced in the foregoing step to provide the laminate material 40. Here, the predetermined configuration means the correspondence to the configuration of the core material 2, the brazing filler metal 3, the sacrificial material 4, and the intermediate material 5 in the clad member for heat exchanger as a product such as, e.g., the clad members 1a to 1f shown in FIGS. 1(a) to 1(f). As a lamination method, a conventionally known method in which, e.g., the both end portions of the core material 26 and the side material 35 are banded is used. Even when a method which performs weld-bonding or the like is used besides the banding method is used, there is no problem.

Note that each of the clearances formed upon lamination is not more than 10 mm at a maximum, and preferably not more than 5 mm.

<Homogenized Heat Treatment Step>

The homogenized heat treatment step S3 is the step of performing the homogenized heat treatment to the laminate material produced in the lamination step S2.

To the laminate material 40 produced in the lamination step S2, the homogenized heat treatment is performed to uniformize the internal structure and soften the laminate material 40 to allow easy hot-rolling thereof.

<Hot Rolling Step>

The hot rolling step S4 is the step of performing hot rolling after the homogenized heat treatment step S3.

In the hot rolling step S4, as shown in FIG. 6(b), the bands of the laminate material 40 mentioned above are cut, and the laminate material 40 is hot-rolled to produce a hot-rolled material 1A. Here, a hot rolling method is practiced by a conventionally known rolling method. As a rolling mill to be used, a 4-high rolling mill 50 is shown in FIG. 6(b). However, a 2-high rolling mill or a 4-high or higher rolling mill, not shown, may also be used. In FIG. 6(b), the 4-high rolling mill 50 including a row of roll stands is shown. However, hot rolling may also be repeatedly performed using a rolling mill including a plurality of rows of roll stands, not shown, till the hot-rolled material 1A having a predetermined thickness is obtained.

(Cold Rolling Step)

The cold rolling step S5 is the step of performing cold rolling after the hot rolling step S4.

The hot-rolled material 1A produced in the hot rolling step S4 is then subjected to cold rolling treatment. By way of example, the cold rolling treatment can be performed with a rolling reduction of 30 to 99%.

As necessary, to impart a desired mechanical property or the like, it is also possible to perform heat treatment (annealing treatment), strain-relief treatment, age hardening treatment, or the like, work the hot-rolled material 1A into a predetermined shape, or cut the hot-rolled material 1A to a predetermined size according to normal practice. As an example of the annealing treatment, it can be shown to perform rough annealing performed before cold rolling, intermediate annealing performed between cold rolling processes, or final annealing performed after the final cold rolling process in a continuous furnace or a batch furnace at 200 to 500° C. for 0 to 10 hours. However, the annealing treatment is not limited thereto. It will be appreciated that conditions therefor can be changed appropriately as long as the effect (mechanical property) obtained by such treatment is achieved.

The clad member for heat exchanger according to the present invention is produced by the individual steps of the method for producing the clad member for heat exchanger described above.

As described above, with the side material, the method for producing the same, and the method for producing the clad member for heat exchanger each according to the present invention, the following effects can be obtained.

In the side material of the present invention, the surface state and flatness thereof are controlled, the flatness and smoothness of the side material improve, and the thickness of an oxide coating further decreases.

In addition, in the production of the clad member for heat exchanger, air present between the core material and each of the side materials is efficiently discharged via the fine groove periodic configurations, the clearance is unlikely to be formed between the core material and each of the side materials, and adhesion improves. Therefore, it is possible to improve the corrosion resistance of the clad member for heat exchanger. Moreover, since pressure bondability improves, the number of pressure bonding passes can be reduced, and the yield and productivity can be improved.

EXAMPLES

Thus far, the best modes for carrying out the present invention have been described, and a description will be given below of examples in which the effects of the present invention have been confirmed.

<<Production of Test Material>>

First, an aluminum alloy for core materials made of JIS 3003 alloy was melted and cast by continuous casting, and subjected to homogenized heat treatment and scalping (surface smoothing) so that an ingot for core materials (core materials (members for core materials)) was obtained. Also, an aluminum alloy for brazing filler metals made of JIS 4045 alloy and an aluminum alloy for sacrificial materials made of the JIS 7072 alloy were melted and cast by continuous casting, subjected to homogenized heat treatment, each sliced to have a predetermined thickness, and subjected to scalping (surface smoothing) so that brazing filler metals (members for brazing filler metals) and sacrificial materials (members for sacrificial materials) were obtained. Note that part of the brazing filler metals and part of the sacrificial materials were not subjected to the homogenized heat treatment. The core materials and the side materials (brazing filler metals and sacrificial materials) were each sized to have a length of 6000 mm and a width of 1000 mm.

To obtain a desired flatness and a surface state having fine groove periodic configurations, the surface smoothing was performed in consideration of a combination with a surface smoothing method and by appropriately adjusting the rotating speed and feeding speed of the disc of an apparatus. Note that, in Comparative Example 13 described later, typical scalping performed conventionally was performed based on the invention described in Cited Document 2, and adjustment for providing the surface state within the scope of the present invention was not particularly performed. Then, for each of side materials thus produced, fine groove periodic configurations (radius of curvature and period) in the surface, surface roughness (ten points mean roughness (Rz)), flatness per meter in the longitudinal direction, and a sheet thickness were measured. The result thereof is shown in Table 1.

Note that the radius of curvature was measured by the method using the photographed image described above, and the period was measured by the method using the resin replica described above. The ten point mean roughness (Rz) was measured with a reference length of 25 mm using a surface roughness meter (SURFCORDER SE-30D) produced by Kosaka Laboratory Ltd. based on "JIS Standard B0601 Surface Roughness". Note that measurement was performed to include a length corresponding to at least two periods or more at a portion of the surface of each of the side materials where the fine groove periodic configurations were formed, i.e., also include fine grooves. The flatness was measured using a flatness measuring apparatus (Zygo mess produced by Zygo Corporation).

Next, the brazing filler metals and the sacrificial materials were respectively laminated on one sides of the core materials and the other sides thereof, banded, subjected to homogenized heat treatment, and then pressure-bonded by hot rolling to provide three-layer sheet materials. The three-layer sheet materials were not subjected to subsequent cold rolling, and the materials after being pressure-bonded by the hot rolling were used as test materials. Then, each of the test materials thus produced was evaluated for the adhesion of the brazing filler metal and the sacrificial material.

<Evaluation of Adhesion>

The adhesion was evaluated by visually observing each of the brazing-filler-metal-side surface and the sacrificial-material-side surface and based on the number of the occurrences of blister (the number of blisters). Note that the blister indicates each of protruding swelling portions generated on the surfaces of the brazing filler metals and the sacrificial materials in the state after the pressure bonding/rolling and having maximum diameters (lengths or widths) of 50 mm or more. Of the test materials, those without a blister were determined to have excellent (◎) adhesion, those in which the numbers of blisters were 1 to 3 were determined to be have good adhesion (○), and those in which the numbers of blisters were 4 or more were determined to have poor adhesion (×). The result is shown in Table 1. Note that, in Table 1, those which do not suit the structure of the present invention and those which do not suit the preferred structure of the present invention are shown by underlining numerical values.

As shown in Table 1, since each of Examples 1 to 14 suited the structure of the present invention, the adhesion of each of the brazing filler metal and the sacrificial material was excellent or good.

Note that, in Example 9, the flatness of the brazing filler metal exceeded a preferred upper limit value so that the adhesion of the brazing filler metal was good, but was not excellent. In Example 10, the thickness of the brazing filler metal was less than a preferred lower limit value while, in Example 11, the thickness of the brazing filler metal exceeded a preferred upper limit value so that the adhesion of the brazing filler metal was good, but was not excellent. Note that, in each of these examples, the clad ratio is likely to be inappropriate.

In Example 14, the flatness of the sacrificial material exceeded a preferred upper limit value so that the adhesion of the sacrificial material was good, but was not excellent. In Example 12, the thickness of the sacrificial material was less than a preferred lower limited value while, in Example 13, the thickness of the sacrificial material exceeded a preferred upper limit value so that the adhesion of the sacrificial material was good, but was not excellent. Note that, in each of these examples, the clad ratio is likely to be inappropriate.

On the other hand, each of Comparative Examples 1 to 12 did not suit the structure of the present invention so that the number of blisters was large, and adhesion was poor. In each of Comparative Examples 13 and 14, the brazing filler metal and the sacrificial material did not have fine groove periodic configurations so that the number of blisters was large on each of the brazing-filler-metal side and the sacrificial-material side, and the adhesion was poor. Note that, if the adhesion is poor, a defect remains also in the thickness of a product sheet, and an aqueous solution containing corrosion accelerating ions of chlorine or the like against a corrosive environment is likely to reach the core material using a defect in the brazing filler metal or the sacrificial material as a path. As a result, corrosion resistance becomes poor.

TABLE 1

| | Brazing filler material | | | | | | | Sacrificial material Fine groove periodic configuration | |
|---|---|---|---|---|---|---|---|---|---|
| | Fine groove periodic configuration | | | | | | | | |
| | Radius | | Ten points | | | | | | |
| Test Material | of curvature (mm) | Period (mm) | mean roughness (μm) | Flatness (mm) | Thickness (mm) | Homogenized heat treatment step | Surface smoothing method | Radius of curvature (mm) | Period (mm) |
| Example 1 | 1000 | 5 | 10 | 0.8 | 90 | With | Cutting | 950 | 7 |
| Example 2 | 850 | 2 | 6 | 0.8 | 90 | With | Cutting | 1300 | 3 |
| Example 3 | 1300 | 7 | 14 | 0.5 | 90 | With | Cutting | 900 | 4 |
| Example 4 | 1450 | 8 | 10 | 0.5 | 90 | With | Cutting | 1000 | 5 |

TABLE 1-continued

| Test Material | | | | | | | | | |
|---|---|---|---|---|---|---|---|---|---|
| Example 5 | 1100 | 3 | 3 | 0.7 | 90 | With | Cutting | 850 | 4 |
| Example 6 | 950 | 6 | 2 | 0.7 | 50 | With | Cutting | 1400 | 6 |
| Example 7 | 1000 | 1 | 7 | 0.2 | 230 | With | Cutting | 1350 | 3 |
| Example 8 | 900 | 4 | 9 | 0.3 | 50 | With | Cutting | 950 | 5 |
| Example 9-1 | 1000 | 5 | 12 | 1.2* | 90 | Without | Cutting | 1000 | 5 |
| Example 9-2 | 1000 | 4 | 11 | 0.6 | 90 | Without | Cutting | 1000 | 4 |
| Example 10 | 1000 | 5 | 7 | 0.6 | 7* | With | Grinding | 1100 | 7 |
| Example 11 | 1000 | 8 | 7 | 0.6 | 280* | With | Grinding | 1000 | 7 |
| Example 12 | 1100 | 4 | 12 | 0.7 | 90 | With | Polishing | 1100 | 4 |
| Example 13 | 1100 | 6 | 12 | 0.8 | 50 | With | Polishing | 900 | 5 |
| Example 14 | 950 | 5 | 10 | 0.7 | 90 | With | Cutting | 1000 | 6 |
| Comp. example 1 | 750* | 3 | 14 | 0.4 | 90 | With | Cutting | 900 | 4 |
| Comp. example 2 | 1700* | 4 | 13 | 0.5 | 90 | With | Cutting | 1100 | 5 |
| Comp. example 3 | 900 | 0.5* | 12 | 0.4 | 90 | With | Cutting | 1200 | 6 |
| Comp. example 4 | 1200 | 9* | 5 | 0.9 | 90 | With | Cutting | 900 | 2 |
| Comp. example 5 | 900 | 7 | 0.5* | 0.3 | 90 | With | Cutting | 1100 | 5 |
| Comp. example 6 | 900 | 7 | 17* | 0.3 | 90 | With | Cutting | 950 | 6 |
| Comp. example 7 | 1100 | 5 | 8 | 0.5 | 90 | With | Cutting | 700* | 3 |
| Comp. example 8 | 1000 | 6 | 7 | 0.9 | 90 | With | Cutting | 1650* | 3 |
| Comp. example 9 | 1200 | 4 | 9 | 0.7 | 90 | With | Cutting | 950 | 0.7* |
| Comp. example 10 | 900 | 6 | 11 | 0.6 | 90 | With | Cutting | 1000 | 10* |
| Comp. example 11 | 1350 | 3 | 10 | 0.3 | 90 | With | Cutting | 950 | 5 |
| Comp. example 12 | 1200 | 6 | 8 | 0.3 | 90 | With | Cutting | 980 | 6 |
| Comp. example 13 | None | None | 6 | 0.6 | 90 | With | Cutting | 1000 | 4 |
| Comp. example 14 | 1100 | 5 | 5 | 0.6 | 90 | With | Cutting | None | None |

| Test Material | Sacrificial material | | | | Thickness of core material (mm) | Adhesion | |
|---|---|---|---|---|---|---|---|
| | Ten points mean roughness (μm) | Flatness (mm) | Thickness (mm) | Homogenized heat treatment step | Surface smoothing method | | Brazing filler material | Sacrificial material |
| Example 1 | 11 | 0.7 | 90 | With | Cutting | 400 | ◎ | ◎ |
| Example 2 | 9 | 0.7 | 90 | With | Cutting | 400 | ◎ | ◎ |
| Example 3 | 3 | 0.6 | 90 | With | Cutting | 400 | ◎ | ◎ |
| Example 4 | 12 | 0.5 | 90 | With | Cutting | 400 | ◎ | ◎ |
| Example 5 | 14 | 0.8 | 90 | With | Cutting | 400 | ◎ | ◎ |
| Example 6 | 9 | 0.8 | 50 | With | Cutting | 400 | ◎ | ◎ |
| Example 7 | 10 | 0.7 | 50 | With | Cutting | 300 | ◎ | ◎ |
| Example 8 | 10 | 0.4 | 230 | With | Cutting | 300 | ◎ | ◎ |
| Example 9-1 | 2 | 0.5 | 90 | With | Grinding | 400 | ○ | ◎ |
| Example 9-2 | 3 | 0.5 | 90 | With | Cutting | 400 | ○ | ◎ |
| Example 10 | 5 | 0.6 | 90 | Without | Cutting | 300 | ○ | ○ |
| Example 11 | 6 | 0.4 | 50 | With | Grinding | 250 | ○ | ◎ |
| Example 12 | 7 | 0.8 | 7* | With | Cutting | 300 | ◎ | ○ |
| Example 13 | 11 | 0.8 | 280* | With | Polishing | 250 | ◎ | ○ |
| Example 14 | 10 | 1.2* | 90 | Without | Cutting | 400 | ◎ | ○ |
| Comp. example 1 | 11 | 0.5 | 90 | With | Cutting | 400 | X | ◎ |
| Comp. example 2 | 9 | 0.5 | 90 | With | Cutting | 400 | X | ◎ |
| Comp. example 3 | 8 | 0.6 | 90 | With | Cutting | 400 | X | ◎ |
| Comp. example 4 | 7 | 0.8 | 90 | With | Cutting | 400 | X | ◎ |
| Comp. example 5 | 8 | 0.8 | 90 | With | Cutting | 400 | X | ◎ |
| Comp. example 6 | 9 | 0.7 | 90 | With | Cutting | 400 | X | ◎ |
| Comp. example 7 | 13 | 0.6 | 90 | With | Cutting | 400 | ◎ | X |
| Comp. example 8 | 9 | 0.4 | 90 | With | Cutting | 400 | ◎ | X |

TABLE 1-continued

| | | | | | | | | |
|---|---|---|---|---|---|---|---|---|
| Comp. example 9 | 4 | 0.7 | 90 | With | Cutting | 400 | ⊚ | X |
| Comp. example 10 | 5 | 0.6 | 90 | With | Cutting | 400 | ⊚ | X |
| Comp. example 11 | 0.4* | 0.8 | 90 | With | Cutting | 400 | ⊚ | X |
| Comp. example 12 | 16* | 0.4 | 90 | With | Cutting | 400 | ⊚ | X |
| Comp. example 13 | 3 | 0.6 | 90 | With | Cutting | 400 | X | ⊚ |
| Comp. example 14 | 3 | 0.6 | 90 | With | Cutting | 400 | ⊚ | X |

While the side material, the method for producing the same, and the method for producing the clad member for heat exchanger each according to the present invention have been described heretofore, the gist of the present invention is not limited to the description thereof, and should be widely construed based on the description in the scope of claims of the present application. It will be appreciated that the technical scope of the present invention can be widely changed or modified within the scope not departing from the gist of the present invention.

The invention claimed is:

1. A side material, comprising
a core material and one or more layers of the side material laminated on one side or both sides thereof to form a side material, wherein
a plurality of fine groove periodic configurations are present in a surface of at least one side of the side material, wherein:
the plurality of fine groove periodic configurations become arcuate toward one direction of the side material;
the plurality of fine groove periodic configurations are formed in a surface of at least one side of the side material;
the fine groove periodic configurations extend to an outer peripheral edge of the side material with a radius of curvature of from 800 to 1500 mm and having a period of 1 to 8 mm in the direction of the side material; and
surface roughness of the side material in the direction is 1 to 15 μm in ten points mean roughness (Rz).

2. The side material according to claim 1, wherein a flatness of the side material per meter in the direction is 1 mm or less.

3. The side material according to claim 1, wherein a thickness of the side material is 10 to 250 mm.

4. A method for producing a side material according to claim 1, comprising carrying out in a following order:
melting a metal for side material having a component composition different from that of a core material;
casting the melted metal for the side material to produce an ingot for the side material;
slicing the ingot for the side material into a slice material having a predetermined thickness; and
performing surface smoothing to a surface of the slice material having the predetermined thickness that has been sliced,
wherein the surface smoothing is performed horizontally with a longitudinal direction of the slice material where a center of a rotating disc apparatus corresponds to a widthwise center of the ingot by controlling the rotating speed of the disc and the feeding speed of the disc over the slice material.

5. The method for producing a side material according to claim 4, wherein, in the slicing, the ingot for side material is sliced in parallel with a seating surface of the ingot for side material which is horizontally seated.

6. The method for producing a side material according to claim 4, further comprising, after the casting and prior to the slicing
performing homogenized heat treatment to the cast ingot for side material.

7. The method for producing a side material according to claim 4, wherein the surface smoothing is performed by one or more methods selected from the group consisting of a cutting method, a grinding method, and a polishing method.

8. A method for producing a clad member for heat exchanger comprising a core material and one or more layers of a side material laminated on one side or both sides thereof, wherein at least one layer of the side material is a side material obtained according to claim 4, the method comprising:
preparing the side material and the core material on which the side material is to be laminated;
laminating the core material and the side material into a predetermined configuration to provide a laminate material;
homogenized heat treating the laminate material;
hot rolling the laminate material after the homogenized heat treating; and
cold rolling the laminate material after the hot rolling.

9. A clad member for heat exchanger comprising the side material of claim 1.

10. The clad member according to claim 9, comprising a core material and one or more layers of the side material.

11. The side material according to claim 1, wherein the radius of curvature is in a range of from 900 to 1300 mm.

12. The side material according to claim 1, wherein the surface roughness is in a range of from 3 to 14 μm.

13. The side material according to claim 1, wherein a flatness value is 0.5 mm or less.

* * * * *